United States Patent Office 3,511,797
Patented May 12, 1970

3,511,797
EMULSION POLISH SYSTEMS
Herbert J. Mellan and Daniel J. Kay, Buffalo, N.Y., assignors to Hooker Chemical Corporation, Niagara Falls, N.Y., a corporation of New York
No Drawing. Continuation-in-part of application Ser. No. 651,963, July 10, 1967. This application Feb. 17, 1969, Ser. No. 799,912
Int. Cl. C08f 45/52; C08g 17/16, 17/18
U.S. Cl. 260—28.5
9 Claims

ABSTRACT OF THE DISCLOSURE

A resinous alkali soluble polymerized partial ester product which comprises (A) a polyol polyester comprised of saturated aliphatic glycol residues connected by ester linkages to dicarboxylic residues selected from the group consisting of terephthalic acid, isophthalic acid, phthalic acid, phthalic anhydride, endo-cis-bicyclo-(2.2.1) hept-5-ene-2,3-dicarboxylic acid, endo-cis-bicyclo-(2.2.1) hept-5-ene-2,3-dicarboxylic anhydride, tetrahydrophthalic acid, tetrahydrophthalic anhydride, hexahydrophthalic acid, hexahydrophthalic anhydride, and mixtures thereof, with the mole ratio of said glycol compound to said dicarboxylic compound being from slightly over one-to-one to two-to-one, said residues having been subsequently connected by ester linkages to (B) tricarboxylic monoaromatic residues a portion of whose carboxyl radicals non-esterified with the said polyol polyester are esterified with a saturated fatty alcohol having 8 to 20 carbon atoms in an amount of from about 0.05 to about 0.50 moles of fatty alcohol for each mole of tricarboxylic compound, and the remainder of the carboxyl radicals on the tricarboxylic compound are in the form selected from the group of free carboxyl and anhydride groups and said partial ester product being characterized by an acid number from about 105 to about 250, a molecular weight from about 450 to about 1350 and a melting point range from about 65 to about 130 degrees centigrade.

An aqueous emulsion coating composition comprising a waxy polymer, a hard polymer derived from ethylenicaly unsaturated monomer, emulsifier, water and the aforementioned resin is also disclosed. These are useful for floor polishes.

---

This is a continuation-in-part of Ser. No. 284,819, filed June 3, 1963, now abandoned, and Ser. No. 615,963, filed July 10, 1967 and now abandoned.

This invention relates to resins which are soluble in aqueous ammonia, for use in emulsion polish systems and to a process for producing such resins. In another aspect the invention relates to improved emulsion polish systems.

Emulsion polishes are sometimes referred to as high resin formulas or polymer type formulas. These formulas contain as the principal ingredient, a polymer emulsion which may be a modified polystyrene, a modified polyacrylic, a blend of the two, or a complex styrene acrylic copolymer. The balance of the polish usually comprises the following components: a synthetic waxy polymer, an ammonia soluble resin, an emulsifying agent, and a diluent comprising water and a basic component such as ammonia or organic amine. Modified polystyrene emulsions are not, in themselves, film formers. A deposition of an emulsion thereof on a surface normally yields a powdery residue. The use of a plasticizer reduces this tendency to some extent, but does not make the particles sufficiently cohesive to give a continuous film. To insure the proper functioning of the small particle size modified polystyrene emulsion, it has been found desirable to provide a redispersible film forming matrix.

Ammonia soluble resins and synthetic waxy polymers, such as emulsifiable polyethylene, are the major components of the film forming matrix. The matrix should be water repellent, hard enough to prevent embedment, flexible to prevent surface cracking or glazing, cohesive and adhesive enough to hold the film to the floor surface. The waxy component is dispersed in the water with the aid of emulsifying agent and the basic component. The resin should be soluble in the basic emulsion system wherein it serves to improve the gloss and hardness of the polish and functions as a binder and leveling agent. A number of polymers have been used as the ammonia soluble resin such as low molecular weight polyols, maleic anhydride and fumaric acid condensation products of polyhydric compounds, shellac and casein. Many of the resins used in the prior art have imparted a dark color to the finish polish and hence have resulted in a darkening of the surfaces, such as wood floors and composition floors such as linoleum rubber, vinyl tile and the like, on which the polish is applied. Likewise, resins used heretofore have not imparted desired water resistance to the emulsion polishes Accordingly, it is an object of this invention to provide an improved ammonia soluble resin for use in emulsion systems, as well as a process for producing such a resin. Another object of the invention is to provide a resin emulsion that is very light in color. Another object is to provide an emulsion polish having superior water resistance and excellent gloss and hardness. A further object is to provide an emulsion polish with greatly improved storage stability. Still another object is to make an emulsion resin that serves as a superior leveling agent in an emulsion polish. Other objects and advantages will become apparent from this specification.

In accordance with this invention, there are provided superior alkali soluble resins having a slight or relatively low degree of cross-linking that are suitable for use in emulsion polish systems, which comprise an alkali soluble polymerized partial ester having a low molecular weight polyol polyester connected by ester-linkages to tricarboxylic aromatic acid residues having thereon radicals independently selected from the group consisting of carboxylic acid and esterified saturated fatty alcohol including the group

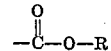

wherein R is the balance of the fatty alcohol. These resins may be prepared by reacting selected dicarboxylic aromatic acids or anhydrides with an excess of dihydroxy saturated glycols to prepare a low molecular weight polyol polyester. This is then reacted with tricarboxylic aromatic acid or anhydride and saturated fatty alcohols preferably simultaneously.

The idealized structure of the invented resins may be generalized as being of the type

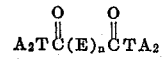

wherein A is COOH and COOR where R is saturated fatty alkyl, T is the nucleus of the tricarboxylic compound, E is the low molecular weight polyol polyester and $n$ is from 1 to 10. It is to be appreciated that the A radical may also be utilized as a site for cross-linking and that E may optionally be a dihydroxy saturated aliphatic compound. Further illustration of the above idealized structure may be had by considering one embodiment of the invention wherein propylene glycol and isophthalic acid are esterified to form the polyol poly r, wihch with stearyl alcohol is then esterified with
iellitic anhydride. Such a resin would consist pri-
ily of repeating groups of

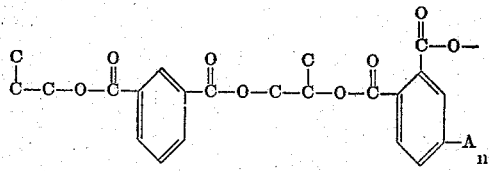

rein A may be either carboxylic acid or esterified
ryl alcohol and n is from 1 to 10. However, the
ol polyester may also have a longer chain length
contain mixed acid residues or be only the aliphatic
roxyl compound. Additionally A may be utilized as
te for cross-linking.

has been found that small amounts of fatty alcohols
er a very desirable but unexpected property to the
nted resins. The monofunctional fatty alcohols con-
superior hydrophobic properties to the invented resins
ddition to serving as a means of controlling molecular
ght. Fatty alcohols suitable for this invention may
characterized as saturated, linear, primary alcohols
ng from 8 to 20 carbon atoms. Preferably these al-
ols will contain from 10 to 20 carbon atoms. The
nted resins contain from about 0.05 to about 0.50
es of fatty alcohol for each mole of tricarboxylic
or anhydride in the resin. Preferably the resin has
1 about 0.10 to about 0.30 mole of fatty alcohol for
l mole of tricarboxylic acid or anhydride. For the
ose of this invention glycerol monostearate, the re-
on product of stearic acid and glycerine, may be
loyed as a means of indirectly introducing fatty
ns to the invented resins. However, the use of this
nique is less desirable because the monostearate
luct being difunctional, it cannot be used to control
cular weight or position fatty chains on the terminal
tions of the resin chain and these products have a
ter susceptibility to saponification. Such saponifica-
products are more hydrophilic and darker in color
corresponding products of saponified fatty alcohols.
able fatty alcohols include octyl alcohol, decyl al-
ol, lauryl alcohol, myristyl alcohol, ceryl alcohol,
l alcohol, stearyl alcohol, dodecyl alcohol and mix-
s thereof.

arious tricarboxylic acids or anhydrides having a
o aromatic nucleus may be used in carrying out this
ntion. However, the anhydride form is preferred
e less water of reaction is formed. It also offers greater
tivity in the points of reactivity with the polyol
olymer. A very suitable tricarboxylic compound for
ying out the invention is trimellitic anhydride. Other
ble tricarboxylic compounds are trimesic acid and
ellitic acid. Further reference to tricarboxylic com-
nds in the specification, exclusive of the examples,
be considered to be denoted when the specific em-
ment trimellitic anhydride is described.

he acid number of the invented resins may be fur-
modified by substituting aromatic dicarboxylic acids
anhydrides for a portion of the tricarboxylic aroma-
cid. This substitution permits a lower acid number
t to be prepared without appreciable change of struc-
or molecular weight from the parent resin. Addi-
ally, the substitution makes possible a second modi-
ion of the resin—a resin with the same number of
radicals as the parent resin but having a higher
cular weight. Up to 50 mole percent of the tricar-
ylic acid may be substituted but preferably less than
nole percent will be substituted.

he use of the term "selected dicarboxylic aromatic
s and anhydrides" as employed herein is to be unaer-
d to means (A) terephthalic acid (B) isophthalic
, (C) phthalic acid, (D) Nadic acid, the tradename
ied to endo-cis-bicyclo(2,2,1)hept-5-ene-2,3-dicar-
zoxylic acid, (E) tetrahydrophthalic Acid, (F) hexahy-
drophthalic acid, and (G) the corresponding anhydride
forms of the above listed acids. The use of other dicar-
boxylic compounds may result in resins that are cross-
linked, that are gelled, or lack desirable physical proper-
ties such as color and hardness.

Suitable hydroxyls for reacting with the above listed
acids and anhydrides to prepare the desired low molecular
weight polyol polyester are aliphatic hydroxyls and these
may be further characterized as saturated hydroxyls hav-
ing two to six carbons. Preferably, these glycols have two
hydroxy groups and are so located as to be unsymmetri-
cal. Suitable glycols include 1,3-butylene glycol, propylene
glycol, ethylene glycol, and mixtures thereof. The poly-
ester generally contains one to five repeating esterified
acid hydroxyl units and the polyester is terminated by a
hydroxyl group.

It is convenient in discussing the resins of this inven-
tion to describe the various reactants and components in
terms of what remains thereof after the reaction has been
completed. The term residue has been employed to iden-
tify the main portion of the reactant after the charac-
teristic radical, such as acid radical or hydroxyl radical
has been chemically consumed.

It is to be appreciated that the molecular weight and
the regularity of repeating groups in the resins of this
invention can be varied over a considerable range. In
fact, a completely regular and repeating unit of pre-
polymer and trimellitic anhydride is not preferred, since
the symmetry reduces the solubility of the invented resins.
The molecular weights of these resins will desirably be
relatively low, that is, between about 450 and about 1350
and preferably from about 600 to about 1200. The trimel-
litic anhydride and polyol polyester are reacted in pro-
portions such that the solid resin product has an acid
number (milligrams of KOH per gram of resin) of about
105 to 250. Solid resins having an acid number from
about 120 to about 160 are preferred for the preparation
of high quality surface coatings. The desired acid number
is achieved by reacting from about slightly over one to
two moles of glycol with one mole of selected dicarboxylic
aromatic acid or anhydride, to prepare the polyol poly-
ester prepolymer, and then reacting small amounts of
fatty alcohol and about one mole of trimellitic anhydride,
preferably simultaneously, with the resulting prepolymer.
The use of less than one mole of trimellitic anhydride
often yields resins which are partially insoluble in am-
monia. Likewise, very high mole weights of trimellitic
anhydride are undesirable since the resulting resins may
form unstable solutions in polish formulations. These
resins have a melting point range of between about 65
to about 130 degrees centigrade, with a range between
about 80 and about 110 degrees centigrade being pre-
ferred.

Any convenient temperature which will permit the
reaction to take place under melt fusion conditions may
be employed in preparing the resin of this invention.
More desirable is the range between 100 and 250 de-
grees centigrade so that the resin may be readily formed,
yet not discolored by oxidation. Thus, this invention pro-
vides resinous alkali soluble polymerized partial ester
product suitable for preparation of alkaline solutions
which comprises (A) a polyol polyester comprised of
saturated aliphatic glycol residues connected by ester
linkages to dicarboxylic residues selected from the group
consisting of terephthalic acid, isophthalic acid, phthalic
acid, phthalic anhydride, endo-cis-bicyclo-(2.2.1)hept-
5-ene-2,3-dicarboxylic acid, endo-cis-bicyclo-(2.2.1)hept-
5-ene-2,3-dicarboxylic anhydride, tetrahydrophthalic
acid, tetrahydrophthalic anhydride, hexahydrophthalic
acid, hexahydrophthalic anhydride, and mixtures thereof,
with the mole ratio of said glycol compound to said
dicarboxylic compound being from slightly over one-to-
one to two-to-one, said residues having been subsequently
connected by ester linkages to (B) tricarboxylic monoaromatic residues a portion of whose carboxyl radicals non-esterified with the said polyol polyester are esterified with a saturated fatty alcohol having 8 to 20 carbon atoms in an amount of from about 0.05 to about 0.50 moles of fatty alcohol for each mole of tricarboxylic compound, and the remainder of the carboxyl radicals on the tricarboxylic compound are in the form selected from the group of free carboxyl and anhydride groups, and is characterized by an acid number of from about 105 to about 250, a molecular weight from about 450 to about 1350, and a mleting point range from about 65 to about 130 degrees centigrade.

A final polish composition of the invention contains in addition to the invented resins, waxy polymers such as polyethylene and polypropylene, hard polymers such as polyvinyl chloride, polyacrylic resin or polystyrene, which are derived from ethylenically unsaturated monomers, leveling agents, materials to reduce slipperiness, compounds to improve gloss, emulsifiers, alkaline materials and water, as the polish solvent. Generally the total solids content of the polish ranges from about six to about 25 percent by weight of the composition, while the preferred total solids of the polish is from about 9 to about 18 percent. The remainder of the composition is usually water.

The invented resins may constitute from 10 to about 70 percent by weight of the total solids in the polish compositions. Particularly good results are obtained when from about 15 to about 60 percent of the total solid content of the polish are the invented resins. The balance of the total solids is composed of polyethylene and polymers such as polystyrene or polyvinylacrylic which are derived from ethylenically unsaturated monomers, the amount of polystyrene usually being in excess of the amount of polyethylene present.

In order to afford storage stability of the water emulsion polish composition, it is adjusted to a pH of at least seven and more usually to a pH from about 7.5 to about 10.

The final water emulsion polish composition of the invention is normally prepared by making a water solution of the resin portion, a water emulsion of a polyethylene portion, and a water emulsion of the polystyrene portion, separately, and then mixing them together to provide the final composition.

The term "soluble" as employed in this disclosure is intended to include the concept of dispersible material in the solvent as well as complete dissolving of the material in the solvent.

RESIN SOLUTION

A solution of the invented ammonia soluble resin is readily prepared for use in a polish emulsion system. In a typical preparation, 100 parts of an ammonia soluble resin and 500 parts of water are charged to a vessel which will not permit loss of voltatile materials. While agitating the mixture in the vessel, about 25 parts of a 28 percent ammonium hydroxide solution is added to the vessel and agitation is continued until the solution of the resin is complete. Gentle heating may be employed to speed the solubilization. In the preparation of the resin solution, the ammonia may be replaced in whole or in part by other alkaline materials as volatile organic amines. Suitable volatile organic amines include the aliphatic and hydroxy aliphatic amines having boiling points below about 200° centigrade at a pressure of 760 millimeters of mercury, for example, morpholine, ethoxypropylamine, 2-amino-2-methyl-1-propanol, ethanolamine, dimethylolamine, ethylene diamine and triethylolamine. The resin solutions generally contain from about 5 to 25 percent solids, preferably about 15 to 20 percent solids.

POLYETHYLENE EMULSION

A typical polyethylene wax emulsion is prepared as follows. 13.9 parts of AC polyethylene 629, a low molecular weight polyethylene wax melt point about 213–221 degrees Fahrenheit, manufactured by Allied Chemical Corporation, New York, N.Y., are heated at a temperature not exceeding 270 degrees Fahrenheit after which to the melted wax are added with agitation 2.1 parts of oleic acid. The mixture is then adjusted to 230 degrees Fahrenheit and agitated until it is uniformly fluid, whereupon 2.4 parts of morpholine are added. The resulting mixture is heated to 250 degrees Fahrenheit and agitation is continued until a uniform blend is produced, which is added to 81.5 parts of water just below 212 degrees Fahrenheit. The emulsion is then quickly cooled to room temperature with agitation.

POLYMER EMULSION

The polymer emulsion or latex, as heretofore noted may contain polystyrene, polyvinyl chloride, or polyacrylic resins. Particularly suited to the polish compositions of this invention are those polystyrene resins having a molecular weight of above 5000, preferably those having a molecular weight above 100,000. Generally these resins have a molecular weight below 600,000. These aqueous emulsions are used to provide high gloss, durability and toughness.

A typical polymer emulsion is prepared by charging into an enclosed mixing vessel at room temperature 34.9 parts of U-203 Ubatol, a polystyrene manufactured by the UBS Chemical Corporation, Cambridge, Mass., and with moderate agitation 11.5 parts of water are added to the vessel. Mixing is continued until the mixture is uniform, whereupon a solution of polish plasticizing agent comprising 1.1 parts of dibutyl phthalate and 0.8 part of trisbutoxyethylphosphate and 51.6 parts of water is added to the vessel after which agitation is continued for 20 minutes.

The practice of this invention is illustrated but no limited by the examples given below. All parts are by weight and all temperatures are in degrees centigrade unless otherwise stated.

RESIN PREPARATION

Example 1

A two liter, 3 necked flask equipped with a stirrer, iner gas feed, recovery trap, vertical steam heated condense and vertical water cooled condenser was charged with 190 grams of propylene glycol. The glycol was heated to 120 degrees and 265 grams of isophthalic acid were added The mixture was then rapidly heated to about 195 to 200 degrees and held there until the charge became clear and the theoretical amount of water had been removed Then, with the temperature at about 130 degrees, th weight of propylene glycol lost earlier was returned to the flask followed by 76 grams of stearyl alcohol and 330 grams of trimellitic anhydride. The mixture was heated to about 195 to 200 degrees and held there until som sublimate was observed forming on the reaction vesse At that point, the temperature was raised to 230 degree and held there for one hour. A vacuum treatment wa applied for several minutes to remove the volatile com ponents and the resin was rapidly poured into a shallov tray. The brittle resin had an acid number of 123, meltin point of 80 degrees and a Gardner color number 9. A ammonia solution of the resulting resin having 16 pei cent total solids was prepared; 11 milliliters of 28 percen ammonia was required for 50 grams of resin. The solu tion had a Gardner Holdt viscosity of $A_3$; Gardner Colo No. 3, pH of 8.75, and a clear appearance.

Example 2

Using the procedure and reactants of Example 1, resin was prepared based on 2.5 moles of propylene gly col, 1.25 isophthalic acid, 1.0 moles trimellitic anhydride and 0.25 mole of "stearyl" alcohol. The reaction tem perature was 200 degrees. The resulting resin had a melt ing point of 82 degrees, acid number of 90, and Gardne Color No. 3. The brittle resin had a clear appearance ammonia solution of this resin (16 percent solids) the following properties: pH of 8.6, Gardner Holdt osity A₃; Gardner Color No. 3, appearance clear.

Example 3

Using the procedure and reactants of Example 1 the n was prepared based on 15.0 moles of propylene gly- 7.5 moles of isophthalic acid, 6.65 moles of trimellitic ydride and 1.5 moles of stearyl alcohol. The resulting n had a melting point of 76 degrees, acid number of , Gardner Color No. 3, and the brittle resin had a r appearance. An ammonia solution of this resin (16 ent solids) had the following properties: pH of 8.7, dner Holdt viscosity A₃; Gardner Color No. 3 and earance, clear.

Example 4

Using the procedure and reactants of Example No. 1, sin was prepared based on 2.5 moles of propylene gly- 1.25 moles of isophthalic acid, 1.06 moles of trimel- anhydride and 0.125 mole of stearyl alcohol. The lting brittle resin had a melting point of 103 degrees, cid number of 136, Gardner Color No. 3, and appear- e, clear. An ammonia solution of this resin (16 per- solids) have the following properties, pH of 8.4, dner Holdt viscosity A₃; Gardner Color No. 3, and earance, clear.

Example 5

Using the procedure and reactants of Example No. 1, sin was prepared based on 2.5 moles of propylene ol, 1.6 moles of isophthalic acid, 1.2 moles of tri- litic anhydride, and 0.28 mole of stearyl alcohol. The lting resin had a melting point of 86 degrees, an acid ber of 144, Gardner Color No. of 3, and a clear ap- rance. An ammonia solution of this resin (16 percent ds) had the following properties, pH of 9.0, Gardner dt viscosity A₃; Gardner Color Number 3, and a clear earance.

Example 6

Using the procedure of Example No. 1, a resin was ared based on 2.5 moles of propylene glycol, 1.6 hthalic acid, 0.8 mole of trimellitic anhydride, 0.29 e of stearyl alcohol and 0.7 mole tetrahydrophthalic ydride. The resulting resin had a melting point of 65 ees, an acid number of 159, Gardner Color No. of 3, a clear appearance. An ammonia solution of this 1 (16 percent solids) had the following properties: of 8.7, Gardner Holdt viscosity A₃; Gardner Color 3, and a clear appearance.

resin similar to the above resin will be obtained n the propylene glycol is replaced with equal molar unt of 1,3-butylene glycol.

Example 7

Using the procedure of Example 1, except where indi- d, a resin was prepared based on 2.5 moles of ethyl- glycol, 1.6 moles of isophthalic acid, 1.2 moles of ellitic anhydride, and 0.27 mole of stearyl alcohol. resulting resin had a melting point of 81 degrees, an number of 150, Gardner Color No. 4, and a clear arance. An ammonia solution of this resin (16 per- solids) and a pH of 9.3, a Gardner Holdt viscosity ₃; Gardner Color No. 12, and a milky appearance.

resin having a lower melting point than the above 1 may be prepared by substituting lauryl alcohol for ke molar amount of stearyl alcohol in the above ulation.

Example 8

Using the procedure of Example 1, a resin was pre- d based on 2.5 moles of propylene glycol, 1.6 moles sophthalic acid, 0.8 mole of trimellitic anhydride, 0.7 e phthalic anhydride, and 0.15 mole of Dytol E-46® mmercial blend of ceryl and stearyl alcohols manu- ured by Rohm and Haas, Philadelephia, Pa. The re- sulting resin had a melting point of 71 degrees, an acid number of 169, Gardner Color No. 3, and a clear appear- ance. An ammonia solution of this resin (16 percent solids) had a pH of 8.7, Gardner Holdt viscosity of A₃, Gardner Color Number of 3, and a clear appearance.

A similar resin is prepared by substituting an equal molar amount of Nadic anhydride for phthalic anhy- dride in the above example.

Example 9

Using the reactants of Example 1, a resin was prepared based on 2.5 moles of propylene glycol, 1.6 moles of isophthalic acid, 0.8 mole of trimellitic anhyride, 0.7 mole of phthalic anhydride, and 0.3 mole of glycerol monostearate, the reaction temperature was 230 degrees. The resulting resin had a melting point of 71 degrees, an acid number of 123, Gardner Color No. 10, and a clear appearance. An ammonia solution of this resin (16 percent solids) had a following properties: pH of 9.0, Gardner Holdt viscosity A₃, Gardner Color No. 10, and a clear appearance.

Example 10

Using the procedure of Example 1, a resin was pre- pared based on 2.5 moles of propylene glycol, 1.6 moles of isophthalic acid, 0.8 mole of trimellitic anhydride, 0.7 mole phthalic anhydride and 0.14 mole of stearyl alcohol. The resulting resin had a melt point of 66 degrees, an acid number of 146, Gardner Color of 11, and a clear appearance. An ammonia solution of this resin (16 per- cent solids) had a pH of 9.0, Gardner Holdt viscosity of A₃, Gardner Color of 4, and a clear appearance.

Example 11

Using the procedure of Example 1, a resin was pre- pared based on 20.0 moles of propylene glycol, 12.8 moles of isophthalic acid, 6.4 moles of trimmellitic anhydride, 5.6 moles of phthalic anhydride and 1.12 moles of stearyl alcohol. Reaction temperatuure was 230 degrees. The resulting resin had a melting point of 73 degrees, an acid number of 137, Gardner Color of 11, and a clear appearance. An ammonia solution of this resin (16 percent solids) had a pH of 9.25, Gardner- Holdt viscosity A₃, Gardner Color No. 3, and a clear ap- pearance.

Commercial (Comparative) resin

A commercially available polyester resin based on wood rosin and having an acid number of 130 was com- pared in this example. An ammonia solution of this resin at 16 percent solids showed the following: Gardner-Holdt viscosity, A₃; Gardner Color No. 10; pH of 8.8, and a clear appearance.

Water emulsion coating compositions were prepared for the coating of linoleum tile. In each case, the coating composition was prepared by stirring together the de- sired amount of polyethylene emulsion and polystyrene emulsion and thereafter adding the ammonia soluble resin portion. If desired, however, all three components of the coating solution may be blended simultaneously.

The compositions were applied under regular test pro- cedures to the test linoleum tiles and the following ob- servations were made with respect to the coatings as they were being applied and the coatings after they had been dried. The abilities of the coatings to spread out and to avoid patches of different thicknesses, leveling were ob- served as the coatings were put onto the tiles. The glosses of the coatings were determined as dried without buffing. The abilities to resist water spotting after drying were determined. Additionally, the abilities of second polish coats to blend in with the previous coats were observed.

Storage stabilities were determined in accordance with American Society Testing Materials Procedure D 1791– 60T. Storage at 52 degrees centigrade for two months is considered appropriate to determine equivalent storage stability at 70 degrees Fahrenheit for one year. Included in the rating symbols provided by this test procedure are OK, meaning no visible change, and G, meaning gel.

TABLE I.—POLISH COMPOSITIONS

| Example | Resin solution of example No. | Parts by weight (1) | | | Gloss | Leveling | Water resistance | Stability ASTM-D-1791 |
|---|---|---|---|---|---|---|---|---|
| | | Resin solution | Polyethylene wax emulsion | Polymer emulsion | | | | |
| 13 | 10 | 40 | 10 | 50 | Good | Good | Good | OK |
| 14 | 10 | 31 | | 69 | Fair | do | Fair | OK |
| 15 | 10 | 30 | 25 | 45 | do | do | do | |
| Comparative: | | | | | | | | |
| 16 | (2) | 40 | 10 | 50 | Good | do | do | OK |
| 17 | | 31 | | 2 69 | Poor | Fair | do | OK |
| 18 | | 30 | 25 | 45 | Fair | Good | do | |

(1) 16 percent total solids.
(2) Polyvinyl acrylic.
(3) Commercial resin, see column 8.

The coating results show that the gloss and leveling properties were equivalent to the control. Additionally, effects due to polish recoating and water resistance were about equivalent, both being satisfactory. Comparable surface hardness and toughness were indicated on all coatings, which were considered to be satisfactory to withstand continuous wear. Coating compositions containing the resins of this invention were noticeably lighter in color than the coatings based on resin polyesters.

Example 19

A two liter, 3 necked flask equipped with a stirrer, inert gas feed, recovery trap, vertical steam heated condenser and vertical water cooled condenser was charged with 190 grams of propylene glycol. The glycol was heated to 120 degrees and 265 grams of isophthalic acid were added. The mixture was then rapidly heated to about 195 to 200 degrees and held there until the charge became clear and the acid value had dropped to 75±15. Then, with the temperature at about 130 degrees, the weight of propylene glycol lost earlier was returned to the flask followed by 76 grams of stearyl alcohol and 330 grams of trimellitic anhydride. The mixture was heated to about 195 to 200 degrees and held there until some sublimate was observed forming on the reaction vessel. At that point, the temperature was raised to 230 degrees and held there for one hour. A vacuum treatment was applied for several minutes to remove the volatile components and the resin was rapidly poured into a shallow tray. The brittle resin had an acid number of 214–219, melting point of 83 degrees centigrade and a solution color of 2. An ammonia solution of the resulting resin having 17 percent total solids was prepared; 21 milliliters of 28 percent ammonia was required for 76 grams of resin. The solution had a Gardner Holdt viscosity of $A_4$; Gardner Color No. 2, pH of 8.0 and a clear appearance.

The invented resins show storage stability at higher contents of resin in polish formulations than do polyester resins based on wood rosin.

Various changes and modifications may be made in the method and apparatus of this invention and in the mole ratios of the resins of this invention, certain preferred ones of which have been herein described, without departing from the spirit and scope of this invention.

What is claimed is:

1. A resinous alkali soluble polymerized partial ester product which consists essentially of (A) a polyol polyester comprised of saturated aliphatic glycol residues, said glycol having from 2 to 6 carbon atoms and connected by ester linkages to dicarboxylic residues selected from the group consisting of terephthalic acid, isophthalic acid, phthalic acid, phthalic anhydride, endo-cisbicyclo-(2.2.1) hept-5-ene-2,3-dicarboxylic acid, endo-cis-bicyclo-(2.2.1) hept-5-ene-2,3-dicarboxylic anhydride, tetrahydrophthalic acid, tetrahydrophthalic anhydride, hexahydrophthalic acid, hexahydrophthalic anhydride, and mixtures thereof, with the mole ratio of said glycol compound to said dicarboxylic compound being from slightly over one-to-one to two-to-two, said residues having been subsequently connected by ester linkages to (B) tricarboxylic monoaromatic residues selected from the group consisting of trimellitic acid, trimellitic anhydride, trimesic acid, and mixtures thereof a portion of whose carboxyl radicals non-esterified with the said polyol polyester are esterified with a saturated fatty alcohol having 8 to 20 carbon atoms in an amount of from about 0.05 to about 0.50 mole of fatty alcohol for each mole of tricarboxylic compound, and the remainder of the carboxylic radicals on the tricarboxylic compound are in the form selected from the group of free carboxyl and anhydride groups, and said partial ester product being characterized by an acid number from about 105 to about 250, a molecular weight from about 450 to about 1350 and a melting point range from about 65 to about 130 degrees centigrade.

2. The partial ester product of claim 1 wherein (A) the polyol polyester is the condensation product of propylene glycol and isophthalic acid, and (B) the tricarboxylic monoaromatic compound is trimellitic anhydride partially esterified with stearyl alcohol.

3. The partial ester product of claim 1 wherein (A) the polyol polyester is the condensation product of propylene glycol and a mixture of isophthalic acid and tetrahydrophthalic anhydride, and (B) the tricarboxylic monoaromatic compound is trimellitic anhydride partially esterified with stearyl alcohol.

4. The partial ester product of claim 1 wherein (A) the polyol polyester is the condensation product of ethylene glycol and isophthalic acid, and (B) the tricarboxylic monoaromatic compound is trimellitic anhydride partially esterified with stearyl alcohol.

5. The partial ester product of claim 1 wherein (A) the polyol polyester is the condensation product of ethylene glycol and isophthalic acid, and (B) the tricarboxylic monoaromatic compound is trimellitic anhydride partially esterified with lauryl alcohol.

6. The partial ester product of claim 1 wherein (A) the polyol polyester is the condensation product of propylene glycol and a mixture of isophthalic acid and phthalic anhydride, and (B) the tricarboxylic monoaromatic compound is trimellitic anhydride partially esterified with a mixture of ceryl and stearyl alcohol.

7. The partial ester product of claim 1 wherein (A) the polyol polyester is the condensation product of propylene glycol and a mixture of isophthalic acid and endo-cis-bicyclo-(2.2.1)hept-5-ene-2,3-dicarboxylic anhydride, and (B) the tricarboxylic monoaromatic compound is trimellitic anhydride and partially esterified with a mixture of ceryl and stearyl alcohol.

8. The partial ester product of claim 1 wherein (A) the polyol polyester is the condensation product of propylene glycol and a mixture of isophthalic acid and phthalic anhydride, and (B) the tricarboxylic monoaromatic compound is trimellitic anhydride partially esterified with glycerol monostearate.

9. In an aqueous emulsion coating composition comprising a waxy polymer, a hard polymer derived from ethylenically unsaturated monomer, a solid resin, emulsifier and water, said resin and mixture of waxy and hard ymers being present in a weight ratio from about 90 to about 70:30, the improvement wherein said n consists essentially of the esterified residues of (A) ow molecular weight polyol polyester obtained by rifying a dicarboxylic compound selected from the up consisting of terephthalic acid, isophthalic acid, halic acid, phthalic anhydride, endo-cis-bicyclo-2.1)hept-5-ene-2,3-dicarboxylic acid, endo-cis-bicyclo-2.1)hept-5-ene-2,3-dicarboxylic anhydride, tetrahydrohalic acid, tetrahydrophthalic anhydride, hexahydrohalic acid, hexahydrophthalic anhydride, and mixtures eof with slightly over one to two moles of a saturated hatic glycol having from 2 to 6 carbon atoms, followed by reaction with (B) a monoaromatic tricarboxylic pound selected from the group consisting of lellitic acid, trimellitic anhydride, trimesic acid, and tures thereof with a portion of whose carboxyl radi- non-esterified with the said polyol polyester are ester- l with (C) a saturated fatty alcohol having 8 to 20 on atoms in an amount of from about 0.05 to about moles of fatty alcohol for each mole of tricarboxylic pound, and the remainder of the carboxyl radicals on tricarboxylic compound are in the form selected from group of free carboxyl and anhydride groups and is acterized by an acid number of from about 105 to ut 250, a molecular weight from about 450 to about 1350 and a melting point range from about 65 to about 130 degrees centigrade, said coating composition having a pH of at least 7.

References Cited

UNITED STATES PATENTS

| | | | |
|---|---|---|---|
| 2,904,533 | 9/1959 | Carlston et al. | 260—75 |
| 2,939,857 | 6/1960 | Bolton et al. | 260—77 |
| 2,972,592 | 2/1961 | Brown et al. | 260—28.5 |
| 3,070,256 | 12/1962 | Bremmer et al. | 260—75 |
| 3,075,936 | 1/1963 | Bolton | 260—77 |
| 3,196,131 | 7/1965 | Hinsdale et al. | |
| 3,122,451 | 2/1964 | Bunge et al. | 260—75 |
| 3,218,282 | 11/1965 | Kay | 260—28.5 |
| 3,223,666 | 12/1965 | Bolton | 260—77 |

OTHER REFERENCES

Boenig, "Unsaturated Polyester: Structure and Properties," Elsevier Publishing Co., New York, 1964, pp. 133 and 135.

ALLAN LIEBERMAN, Primary Examiner

U.S. Cl. X.R.

260—29.6, 75, 77